United States Patent
Kim et al.

(10) Patent No.: US 9,894,218 B2
(45) Date of Patent: Feb. 13, 2018

(54) APPARATUS AND METHOD FOR PROCESSING SCAN DATA IN THE EVENT OF ESD INPUT

(71) Applicant: S-PRINTING SOLUTION CO., LTD., Suwon-si (KR)

(72) Inventors: Jung-han Kim, Suwon-si (KR); Dong-yeol Jung, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/534,878

(22) Filed: Nov. 6, 2014

(65) Prior Publication Data

US 2015/0215477 A1    Jul. 30, 2015

(30) Foreign Application Priority Data

Jan. 28, 2014 (KR) .......................... 10-2014-0010880

(51) Int. Cl.
*H04N 1/00* (2006.01)

(52) U.S. Cl.
CPC ..... *H04N 1/00082* (2013.01); *H04N 1/00018* (2013.01); *H04N 1/00037* (2013.01); *H04N 1/00976* (2013.01)

(58) Field of Classification Search
CPC .......... H04N 1/00082; H04N 1/00018; H04N 1/00037; H04N 1/00976
See application file for complete search history.

(56) References Cited

U.S. PATENT DOCUMENTS

| 5,365,349 | A | 11/1994 | Knodt et al. |
| 6,734,998 | B2 | 5/2004 | Tsai et al. |
| 7,433,539 | B2 | 10/2008 | Wang et al. |
| 7,583,484 | B2 * | 9/2009 | Wu et al. ........................ 361/56 |
| 2005/0041346 | A1 | 2/2005 | Wu et al. |
| 2005/0134624 | A1 | 6/2005 | Mizes |
| 2005/0157352 | A1 * | 7/2005 | Oh ............................. 358/474 |
| 2006/0110060 | A1 * | 5/2006 | Wang .................. H04N 1/4097 382/254 |
| 2006/0217268 | A1 | 9/2006 | Lin |
| 2006/0226886 | A1 | 10/2006 | Yamada et al. |
| 2010/0085368 | A1 | 4/2010 | Shin et al. |
| 2010/0149701 | A1 | 6/2010 | Drapkin et al. |

(Continued)

FOREIGN PATENT DOCUMENTS

| CN | 1645898 | 7/2005 |
| CN | 1697177 | 11/2005 |

(Continued)

OTHER PUBLICATIONS

International Search Report and Written Opinion of the International Searching Authority dated Nov. 18, 2014 in International Patent Application No. PCT/KR2014/007612.

(Continued)

*Primary Examiner* — Iriana Cruz
(74) *Attorney, Agent, or Firm* — Staas & Halsey LLP (57) ABSTRACT

An image forming apparatus includes a scanner configured to acquire scan data by scanning a scan target, an electrostatic discharge (ESD) detector configured to detect an ESD when the scan data is acquired, and a data processor configured to process the scan data acquired when the ESD is detected according to an operation state of the scanner.

17 Claims, 5 Drawing Sheets

(56) References Cited

U.S. PATENT DOCUMENTS

| | | |
|---|---|---|
| 2010/0201899 A1 | 8/2010 | Yamamoto |
| 2010/0245342 A1 | 9/2010 | Kawagoe et al. |
| 2012/0072139 A1 | 3/2012 | Reed et al. |
| 2013/0027820 A1 | 1/2013 | Padilla et al. |
| 2014/0211268 A1* | 7/2014 | Huang ............... H04N 1/00018 358/406 |

FOREIGN PATENT DOCUMENTS

| | | |
|---|---|---|
| CN | 101800016 | 8/2010 |
| EP | 1330111 A3 | 7/2003 |
| JP | 2000-244691 | 9/2000 |
| JP | 2002-354262 | 12/2002 |
| JP | 2005-140974 | 6/2005 |
| JP | 2005-182045 | 7/2005 |
| JP | 2009-278563 | 11/2009 |
| KR | 10-0573668 | 4/2006 |
| KR | 10-2007-0042693 | 4/2007 |
| KR | 10-2010-0090644 | 8/2010 |
| KR | 10-1150326 | 6/2012 |
| RU | 2154916 C2 | 8/2000 |

OTHER PUBLICATIONS

Australian Office Action dated Apr. 24, 2015 in Australian Patent Application No. 2014265048.
Russian Office Action dated Feb. 11, 2016 in Russian Patent Application No. 2014153034.
Extended European Search Report dated Jun. 13, 2016 in European Patent Application No. 14795934.0.
Office Action dated Oct. 20, 2016 in corresponding Korean Patent Application No. 10-2014-0010880.
Chinese Office Action dated Mar. 1, 2017 in corresponding Chinese Patent Application No. 201480001592.7.
Korean Office Action dated Apr. 1, 2017 in corresponding Korean Patent Application No. 10-2014-0010880.
Korean Office Action dated May 15, 2017 in corresponding Korean Patent Application No. 10-2014-0010880.

* cited by examiner

Case 1

| flagESD | ESD DETECTION INFORMATION | DISTANCE RATIO RESPECT TO Nth SCAN LINE |
|---|---|---|
| flagESD (N-1) | FALSE | 1 |
| flagESD (N) | TRUE | 0 |
| flagESD (N+1) | FALSE | 1 |

⇧

| Scanline index | ESD Label | 3×3 FILTER COEFFICIENT | | |
|---|---|---|---|---|
| N-1 | FALSE | 0 | 1/2 | 0 |
| N | TRUE | 0 | 0 | 0 |
| N+1 | FALSE | 0 | 1/2 | 0 |

Case 2

| flagESD | ESD DETECTION INFORMATION | DISTANCE RATIO RESPECT TO Nth SCAN LINE |
|---|---|---|
| flagESD (N-1) | FALSE | 1 |
| flagESD (N) | TRUE | 0 |
| flagESD (N+1) | TRUE | 1 |
| flagESD (N+2) | FALSE | 2 |

⇧

| ESDLabel | 5×5 FILTER COEFFICIENT | | | | |
|---|---|---|---|---|---|
| N-2 | FALSE | 0 | 0 | 0 | 0 | 0 |
| N-1 | FALSE | 0 | 0 | 2/3 | 0 | 0 |
| N | TRUE | 0 | 0 | 0 | 0 | 0 |
| N+1 | TRUE | 0 | 0 | 0 | 0 | 0 |
| N+2 | FALSE | 0 | 0 | 1/3 | 0 | 0 |

Case 3

| flagESD | ESD DETECTION INFORMATION | DISTANCE RATIO RESPECT TO Nth SCAN LINE |
|---|---|---|
| flagESD (N-1) | FALSE | 1 |
| flagESD (N) | TRUE | 0 |
| flagESD (N+1) | TRUE | 1 |
| flagESD (N+2) | TRUE | 2 |
| flagESD (N+3) | FALSE | 3 |

⇧

| ESDLabel | 7×7 FILTER COEFFICIENT | | | | | | |
|---|---|---|---|---|---|---|---|
| N-3 | FALSE | 0 | 0 | 0 | 0 | 0 | 0 | 0 |
| N-2 | FALSE | 0 | 0 | 0 | 0 | 0 | 0 | 0 |
| N-1 | FALSE | 0 | 0 | 0 | 3/4 | 0 | 0 | 0 |
| N | TRUE | 0 | 0 | 0 | 0 | 0 | 0 | 0 |
| N+1 | TRUE | 0 | 0 | 0 | 0 | 0 | 0 | 0 |
| N+2 | TRUE | 0 | 0 | 0 | 0 | 0 | 0 | 0 |
| N+3 | FALSE | 0 | 0 | 0 | 1/4 | 0 | 0 | 0 |

FIG. 8

APPARATUS AND METHOD FOR PROCESSING SCAN DATA IN THE EVENT OF ESD INPUT

CROSS-REFERENCE TO RELATED APPLICATIONS

This application claims the priority benefit of Korean Patent Application No. 10-2014-0010880, filed on Jan. 28, 2014, in the Korean Intellectual Property Office, the disclosure of which is incorporated herein in its entirety by reference.

BACKGROUND

1. Field

One or more embodiments relate to apparatuses and methods for processing scan data in the event of an electrostatic discharge (ESD) input.

2. Description of the Related Art

A high-voltage electrostatic discharge (ESD) may occur instantaneously in an image forming apparatus due to various factors. For example, an ESD may occur when a user operates an image forming apparatus or due to internal components of the image forming apparatus.

Image forming apparatuses, such as copiers, multifunctional printers (MFPs), and scanners, may malfunction due to the occurrence of an ESD, and image distortion may occur because such an ESD affects internal signals of an image forming apparatus.

SUMMARY

In an aspect of one or more embodiments, there are provided apparatuses and methods for processing scan data acquired in the event of electrostatic discharge (ESD) occurrence.

In an aspect of one or more embodiments, there is provided an image forming apparatus which includes a scanner configured to acquire scan data by scanning a scan target; an ESD detector configured to detect an ESD when the scan data is acquired; and a data processor configured to process, according to an operation state of the scanner, the scan data acquired when the ESD is detected.

The ESD detector may include a flip-flop configured to output an ESD detection signal to the data processor when the ESD is detected, a high state of the EDS detection signal being maintained until a synchronization point of a next scan line.

The ESD detector may include a voltage divider circuit configured to convert an ESD signal into a voltage having a level detectable by a flip-flop.

The data processor may determine whether the operation state of the scanner is a calibration step (operation) or a real scan step (operation).

When the operation state of the scanner is a calibration step, the data processor may delete scan data of a current scan line and transmit a signal indicating a need to re-scan an image of the current scan line to the scanner.

When the operation state of the scanner is a calibration step, the data processor may delete scan data of a current scan line and transmit a signal which instructs the scanner to re-scan a scan target of the current scan line.

When the operation state of the scanner is a real scan step, the data processor may generate interpolation data based on scan data of scan lines adjacent to a current scan line and replace scan data of the current scan line by the interpolation data.

The scan lines adjacent to the current scan line may be scan lines which are right before and right after the current scan line and in which no ESD has occurred.

The data processor may perform interpolation by applying a filter coefficient to the scan data of the scan lines adjacent to the current scan line, wherein the filter coefficient is determined according to a distance between the current scan line and the scan lines adjacent to the current scan line.

The data processor may transmit a signal indicating an ESD occurrence and a signal indicating correction of the scan data to a user interface.

In an aspect of one or more embodiments, there is provided a method of processing scan data which includes acquiring scan data by scanning a scan target; detecting an ESD when the scan data is acquired; and processing the scan data acquired when the ESD is detected according to a scanning state.

The detecting of the ESD may include outputting an ESD detection signal to a data processor when the ESD is detected, a high state of the ESD detection signal being maintained until a synchronization point of a next scan line.

The detecting of the ESD may include converting an ESD signal into a voltage having a level detectable by a flip-flop.

The processing of the scan data may include determining whether the state of the scanning is a calibration step (operation) or a real scan step (operation).

When the state of the scanning is a calibration step, the processing of the scan data may further include deleting scan data of a current scan line and transmitting a signal indicating a need to re-scan an image of the current scan line to the scanner.

When the state of the scanning is a calibration step, the processing of the scan data may further include deleting scan data of a current scan line and transmitting a signal to instruct the scanner to re-scan the current scan line of the scan target.

When the state of the scanning is a real scan step, the processing of the scan data may further include generating interpolation data based on scan data of scan lines adjacent to a current scan line and replacing scan data of the current scan line by the interpolation data, when the state of the scanning is a real scan step.

The scan lines adjacent to the current scan line may be scan lines which are right before and right after the current scan line and in which no ESD has occurred.

The processing of the scan data may further include performing interpolation by applying a filter coefficient to the scan data of the scan lines adjacent to the current scan line, wherein the filter coefficient is determined according to a distance between the current scan line and the scan lines adjacent to the current scan line.

The method may further include displaying ESD occurrence/non-occurrence information and scan data correction/non-correction information.

In an aspect of one or more embodiments, there is provided at least one non-transitory computer readable medium storing computer readable instructions which when executed implement methods of one or more embodiments.

BRIEF DESCRIPTION OF THE DRAWINGS

These and/or other aspects will become apparent and more readily appreciated from the following description of embodiments, taken in conjunction with the accompanying drawings in which:

FIG. 7 is a diagram illustrating filtering coefficients and labels according to the ESD occurrence modes of FIG. 6.

DETAILED DESCRIPTION

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects of the present description.

Hereinafter, embodiments will be described in detail with reference to the accompanying drawings.

Figure 1:
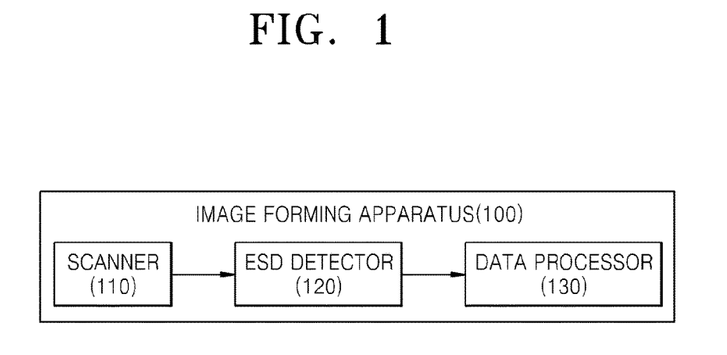
FIG. 1 is a block diagram of an image forming apparatus according to an embodiment.

FIG. 1 is a block diagram of an image forming apparatus 100 according to an embodiment. Referring to FIG. 1, the image forming apparatus 100 includes a scanner 110, an electrostatic discharge (ESD) detector 120, and a data processor 130. The image forming apparatus 100 may process scan data according to an operation state of the scanner 110 when an ESD is detected. Scan data of a scan line, in which an ESD is detected, includes a signal distortion. Thus, the image forming apparatus 100 may reacquire scan data or use other scan data to generate interpolation data and replace distorted scan data with the interpolation data.

The scanner 110 acquires scan data by scanning a scan target. The scanner 110 may divide a scan region into scan lines and acquire scan data of each of the scan lines. The scan target is disposed in the scan region of the image forming apparatus 100.

The ESD detector 120 detects ESD input from an outside in process of acquiring scan data. When an ESD is detected, the ESD detector 120 outputs a signal indicating detection of the ESD to the data processor 130.

The data processor 130 processes scan data acquired in the event of an ESD occurrence according to an operation state of the scanner 110. The data processor 130 determines whether the operation state of the scanner 110 is a calibration step (operation) or a real scan step (operation), and processes the acquired scan data according to the determined step (operation).

When the operation state of the scanner 110 is a calibration step, the data processor 130 deletes scan data of a current scan line and transmits a signal indicating a need to re-scan an image of the current scan line to the scanner 110. The calibration step is a step of acquiring reference data necessary to scan the scan target. In other words, scan data acquired in the calibration step is reference data. Thus, the reference data acquired in the event of an ESD occurrence affects scan data acquired in the real scan step. Thus, since the reference data has to be reacquired, the data processor 130 transmits a signal indicating a need to reacquire the reference data to the scanner 110.

When the operation state of the scanner 110 is a real scan step, the data processor 130 generates interpolation data based on scan data of scan lines adjacent to a current scan line and replaces scan data of the current scan line by the interpolation data. The real scan step is a step of acquiring a scan image by scanning the scan target. Even when an ESD occurs in a scan line, the data processor 130 may replace scan data of the scan line in which the ESD has occurred with data of another scan line. The image forming apparatus 100 scans a next scan line without acquiring scan data by re-scanning.

For example, the data processor 130 may use scan data of scan lines that are most adjacent to the current scan line. The scan lines adjacent to the current scan line may be scan lines which are right before and right after the current scan line and in which no ESD has occurred.

Figure 2:
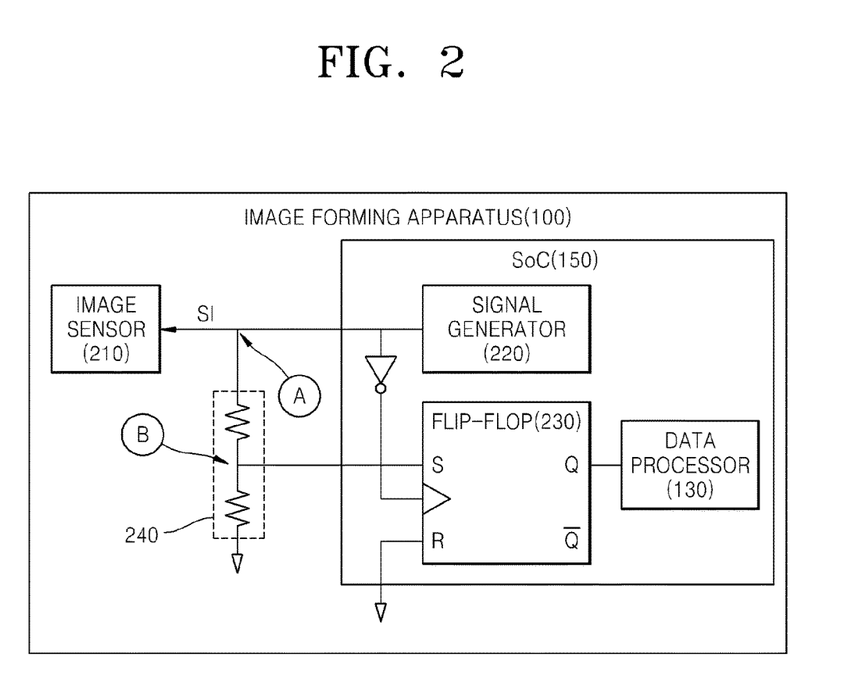
FIG. 2 is a block diagram of an image forming apparatus according to an embodiment.

FIG. 2 is a block diagram of an image forming apparatus 100 according to an embodiment. FIG. 2 illustrates another embodiment of the image forming apparatus 100 illustrated in FIG. 1. Thus, the descriptions of the image forming apparatus 100 of FIG. 1 may also apply to the image forming apparatus 100 of FIG. 2.

Referring to FIG. 2, the image forming apparatus 100 includes an image sensor 210 and a system on chip (SoC) 150. The SoC 150 includes a signal generator 220, a flip-flop 230, and a data processor 130.

The image sensor 210 scans a scan target when a driving signal is input thereto. The image sensor 210 divides a scan target located in a scan region into scan lines and scans the scan lines. Acquired scan data of each of the scan lines is transmitted to the data processor 130.

The signal generator 220 generates an SI signal for driving the image sensor 210. The SI signal functions to transfer photoelectrons stored in a photodiode in the image sensor 210 to a shift register. Also, the SI signal functions to control an exposure time of the image sensor 210 and synchronize the image sensor 210, the flip-flop 230, and the data processor 130.

A voltage divider circuit 240 converts an ESD signal into a voltage with a level detectable by the flip-flop 230. For example, the voltage divider circuit 240 may include two resistors. Since the ESD signal may be several kilovolts (kV), the voltage divider circuit 240 converts a level of the ESD signal applied at a point A into a voltage with a level detectable by the flip-flop 230 by controlling a resistance ratio of the resistors.

The flip-flop 230 determines that an ESD has occurred. When a level of a voltage at a point B is a predetermined threshold value or more, the flip-flop 230 outputs an ESD detection signal to the data processor 130, a high state of the ESD detection signal being maintained until a synchronization point of a next scan line. An operation of the flip-flop 230 will be described later in detail with reference to FIG. 3.

The data processor 130 determines whether an ESD has occurred based on the ESD detection signal and performs an interrupt service routine (ISR) when it is determined that the ESD has occurred. In the process of performing the ISR, the data processor 130 determines a type of a current scan step with reference to a scan interface. The ISR will be described later in detail with reference to FIG. 4.

The data processor 130 transmits a signal indicating occurrence of the ESD and a signal indicating correction of the scan data to a user interface (not illustrated). The user interface displays an ESD occurrence indication or a scan data correction indication to a user.

Figure 3:
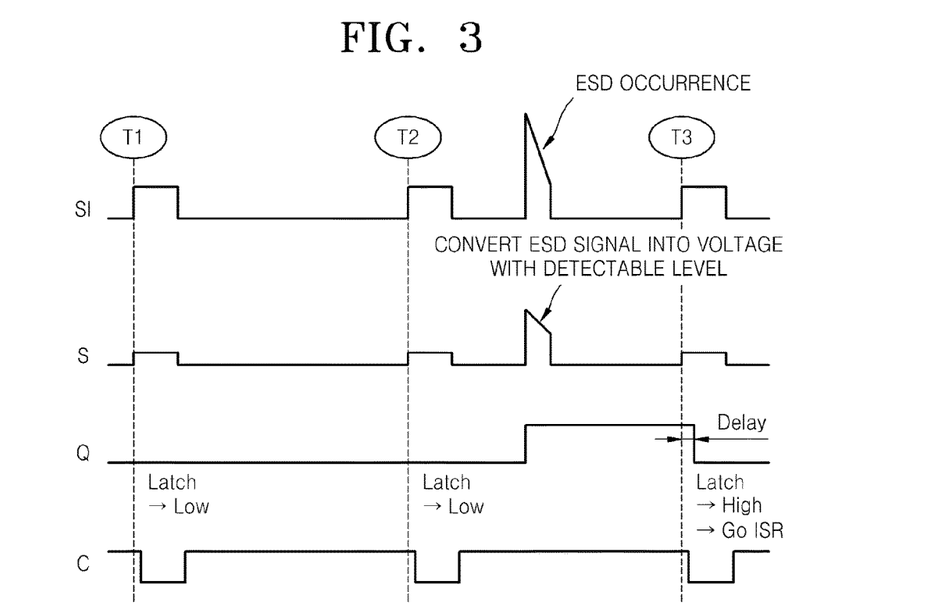
FIG. 3 is a timing diagram of signals for ESD occurrence detection and data correction.

FIG. 3 is a timing diagram of signals for ESD occurrence detection and data correction.

Referring to FIG. 3, an SI signal is output from the signal generator 220 to the image sensor 210 to drive the image sensor 210. FIG. 3 shows that an ESD has occurred between a time T2 and a time T3. The ESD may be an instantaneous pulse input.

An S signal is input to the flip-flop 230. The S signal has a lower voltage than the SI signal. An ESD signal of several kV is converted into a signal of several V by the voltage divider circuit 240.

A Q signal is an ESD detection signal that is output from the flip-flop 230 to the data processor 130. The Q signal maintains a high state from an ESD occurrence point to a next SI signal generation point, and maintains a high state for a predetermined time after the next SI signal generation point. For example, the Q signal maintains a high state for a predetermined time after the time T3. The data processor 130 determines that an ESD has occurred by detecting that an input Q signal is in a high state after the time T3.

A C signal is a reset signal input to the flip-flop 230 and has an inverse phase with respect to the SI signal. Also, the C signal is delayed by a predetermined time than the SI signal generation point in order to secure a time for the data processor 130 to detect (latch) the Q signal.

Figure 4:
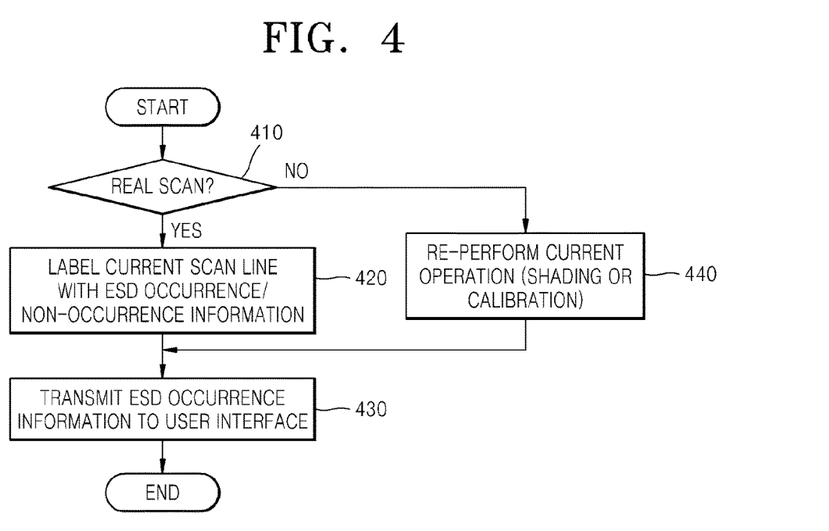
FIG. 4 is a flowchart of processing scan data when ESD is detected.

FIG. 4 is a flowchart of processing scan data when an ESD is detected. Referring to FIG. 4, the data processor 130 performs an ISR when determining that an ESD has been detected.

In operation 410, the data processor 130 determines whether a current scan line is being really scanned. The real scan is a step of acquiring data of a scan target, and a step of acquiring reference data is not a real scan. When the current scan line is being really scanned, the data processor 130 performs operation 420; and when the current scan line is not being really scanned, the data processor 130 performs operation 440.

In operation 420, the data processor 130 labels the current scan line with ESD occurrence/non-occurrence information. The labeled scan line may be a scan line in which an ESD has occurred, and the labeling may be represented as TRUE or FALSE. Labeling information may be used as an input of a filter.

In operation 430, the data processor 130 transmits ESD occurrence information to the user interface. The ESD occurrence information may be information about a scan line in which an ESD has occurred, and information about whether interpolation has been performed.

In operation 440, the data processor 130 re-performs a current operation. Since shading or calibration, which is not a real scan, has to be re-performed, the data processor 130 transmits an instruction to the image sensor 210 to re-perform the current operation.

Figure 5:
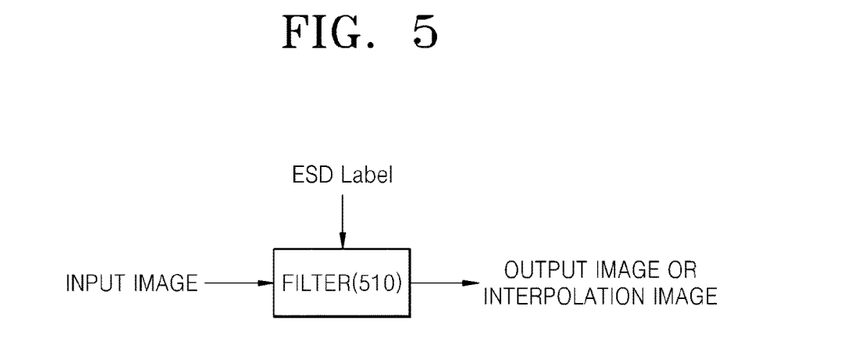
FIG. 5 is a diagram illustrating an example of generating interpolation data by using an ESD label.

FIG. 5 is a diagram illustrating an example of generating interpolation data by using an ESD label. Referring to FIG. 5, the data processor 130 generates an output image or an interpolation image by using a filter 510. The data processor 130 uses labeling information, which indicates whether an ESD has been detected in each scan line, as an input of the filter 510. The data processor 130 generates interpolation data of a scan image in which an ESD has occurred from among scan images of the scan lines. The data processor 130 may generate interpolation data by filtering a scan image in which no ESD has occurred from among scan images.

Figure 6:
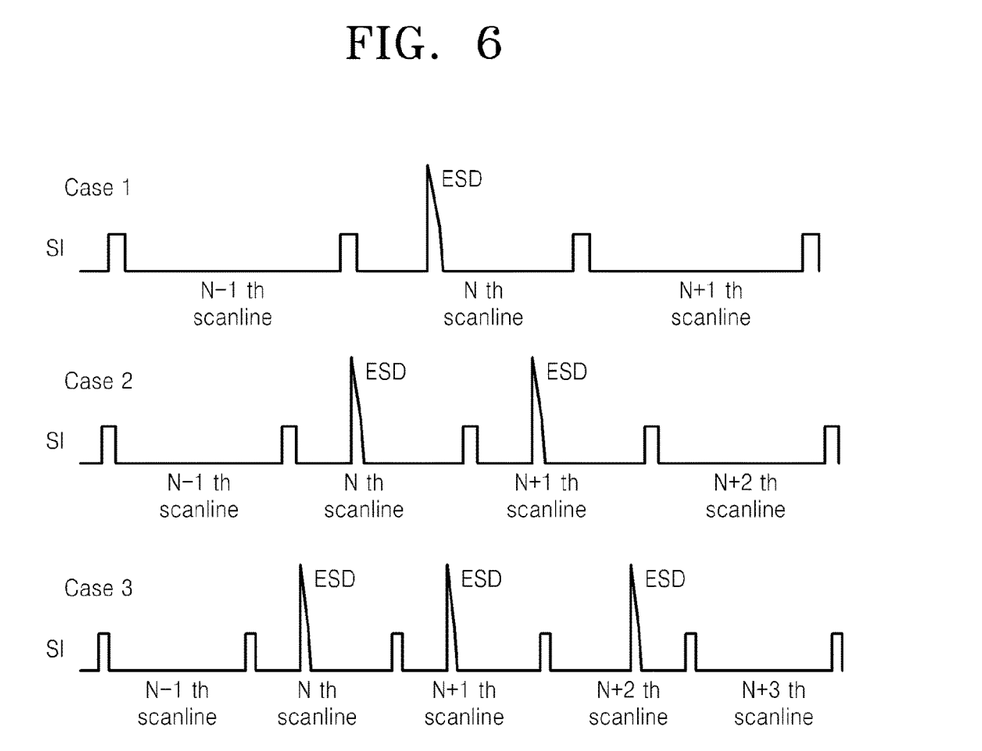
FIG. 6 is a diagram illustrating examples of ESD occurrence modes.

FIG. 6 is a diagram illustrating examples of ESD occurrence modes.

Referring to FIG. 6, in Case 1, an ESD has occurred in an Nth scan line. Thus, the data processor 130 performs labeling indicating that ESD has occurred in the Nth scan line. In order to generate an interpolation image of an Nth scan image, the data processor 130 generates an interpolation image of the Nth scan line by using an (N−1)th scan image and an (N+1)th scan image in which ESD has not occurred.

In Case 2, an ESD has occurred in Nth and (N+1)th scan lines. Thus, the data processor 130 performs labeling indicating that ESD has occurred in the Nth and (N+1)th scan lines. In order to generate interpolation images of Nth and (N+1)th scan images, the data processor 130 generates interpolation images of the Nth and (N+1)th scan lines by using an (N−1)th scan image and an (N+2)th scan image in which ESD has not occurred.

In Case 3, an ESD has occurred in Nth to (N+2)th scan lines. Thus, the data processor 130 performs labeling indicating that ESD has occurred in the Nth to (N+2)th scan lines. In order to generate interpolation images of Nth to (N+2)th scan images, the data processor 130 generates interpolation images of the Nth to (N+2)th scan lines by using an (N−1)th scan image and an (N+3)th scan image in which no ESD has occurred.

FIG. 7 is a diagram illustrating filter coefficients and labels according to the ESD occurrence modes of FIG. 6. Referring to FIG. 7, the data processor 130 performs interpolation by applying a filter coefficient to scan data of the scan lines adjacent to the current scan line. The filter coefficient is determined according to a distance between a current scan line and the scan lines adjacent to the current scan line.

Since in Case 1 an ESD has occurred in the Nth scan line, a distance ratio of the (N−1)th and (N+1)th scan images is set to 1. Thus, the data processor 130 generates an interpolation image by applying a filter coefficient of "½" to the (N−1)th and (N+1)th scan images.

Since in Case 2 an ESD has occurred in the Nth and (N+1)th scan lines, a distance ratio of the (N−1)th scan image with respect to the Nth scan line is set to 1 and a distance ratio of the (N+2)th scan image is set to 2. Thus, the data processor 130 generates an interpolation image of the Nth scan line by applying a filter coefficient "⅔" to the (N−1)th scan image and applying a filter coefficient of "⅓" to the (N+2)th scan image. In other words, since there is a high probability that the (N−1)th scan image will be more similar to the Nth scan image than to the (N+2)th scan image, the data processor 130 applies a greater filter coefficient to the (N−1)th scan image than to the (N+2)th scan image.

Since in Case 3 an ESD has occurred in the Nth to (N+2)th scan lines, a distance ratio of the (N−1)th scan image with respect to the Nth scan line is set to 1 and a distance ratio of the (N+3)th scan image is set to 3. Thus, the data processor 130 generates an interpolation image of the Nth scan line by applying a filter coefficient of "¾" to the (N−1)th scan image and applying a filter coefficient of "¼" to the (N+3)th scan image. In other words, since there is a high probability that the (N−1)th scan image will be more similar to the Nth scan image than to the (N+3)th scan image, the data processor 130 applies a greater filter coefficient to the (N−1)th scan image than to the (N+3)th scan image.

Figure 8:
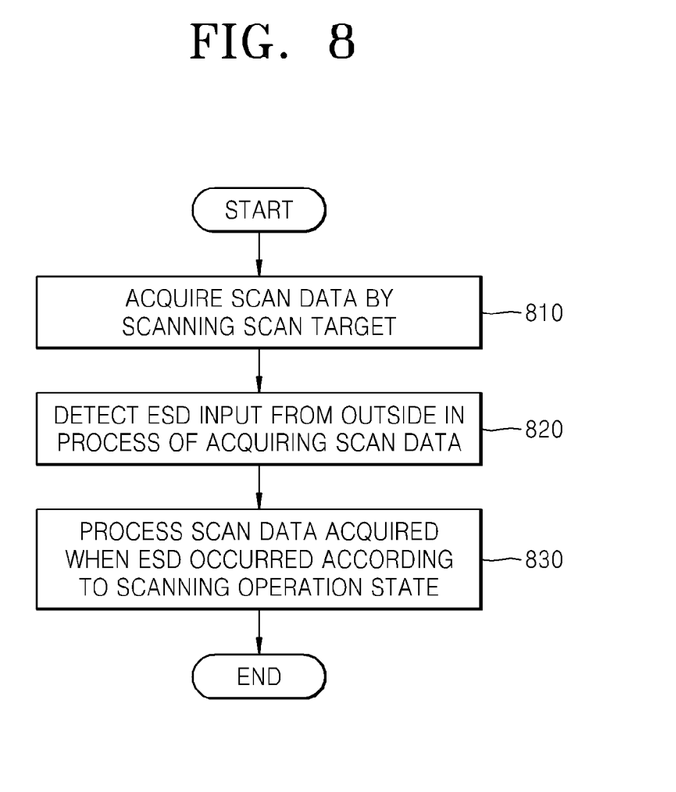
FIG. 8 is a flowchart of a scan data processing method according to an embodiment.

FIG. 8 is a flowchart of a scan data processing method according to an embodiment. FIG. 8 illustrates an embodiment of the image forming apparatus 100 illustrated in FIG. 1. Thus, the descriptions of the image forming apparatus 100 of FIG. 1 may also apply to the scan data processing method of FIG. 8. Referring to FIG. 8, the image forming apparatus 100 detects an ESD that occurs when scan data is acquired, and processes the acquired scan data according to a scanning operation state.

In operation 810, the image forming apparatus 100 acquires scan data by scanning a scan target. The scan data may be calibration data or a scan image. The calibration data is reference data that is acquired before a real scan is performed.

In operation 820, the image forming apparatus 100 detects an ESD that occurs when scan data is acquired. When a voltage with a predetermined level or higher is applied thereto, the image forming apparatus 100 may determine that an ESD has occurred.

In operation 830, the image forming apparatus 100 processes scan data acquired when the ESD has occurred according to the scanning operation state. The image forming apparatus 100 may determine the scanning operation state, and delete scan data or reacquire scan data according to the determined scanning operation state. When the scanning operation state is a calibration step, the image forming apparatus 100 reacquires scan data and continues to perform a scanning operation. When the scanning operation state is a real scan step, the image forming apparatus 100 deletes scan data, generates interpolation data, and replaces the deleted scan data by the interpolation data.

The image forming apparatus 100 provides ESD occurrence information to the user through the user interface.

The image forming apparatus 100 includes an image sensor 210, a voltage divider circuit 240, and a processor.

The image sensor 210 acquires scan data by scanning a scan target.

The voltage divider circuit 240 changes a level of a signal input to the image sensor 210. For example, the voltage divider circuit 240 changes a level of an ESD that affects a signal operation of the image sensor 210. The voltage divider circuit 240 includes two or more resistors, and converts the ESD, which has occurred, into a voltage signal having an appropriate level so that the voltage signal is processable by the processor. The voltage signal processable by the processor is a range that does not cause malfunction of the processor.

The voltage divider circuit 240 includes resistors having different resistances, and is connected in parallel to the image sensor 210. The voltage divider circuit 240 may include two resistors that are connected in series. A resistance ratio of the two resistors may be adjusted. The processor may be connected to a terminal between the two resistors to receive an ESD signal with a reduced level.

The processor executes firmware for processing scan data according to a signal acquired from the voltage divider circuit 240. The firmware is a program that performs a method of determining whether an ESD has occurred and processing scan data when the ESD has occurred. The firmware compares a level of a signal input from the voltage divider circuit 240 with a threshold value to determine whether the ESD has occurred. For example, when the level of the signal input from the voltage divider circuit 240 is greater than the threshold value, the firmware determines that the ESD has occurred. The firmware processes scan data acquired when the ESD has occurred according to the current operation state.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:
1. An image forming apparatus comprising:
a scanner configured to acquire scan data by scanning a scan target;
an electrostatic discharge (ESD) detector configured to detect an ESD; and
a data processor configured to:
determine an operation state of the scanner, when the ESD is detected, as a calibration operation to acquire reference data or a real scan operation to acquire scan image data,
delete at least a portion of the scan data which is acquired during the calibration operation upon the determined operation state of the scanner when the ESD is detected being the calibration operation and reacquire the portion of scan data by rescanning the scan target and replacing the portion of the scan data deleted, the scan data acquired during the calibration operation including the reference data, and
generate replacement scan data without requiring the rescanning of the scan target upon the determined operation state of the scanner when the ESD is detected being the real scan operation, and replace the scan data acquired during the real scan operation with the generated replacement scan data,
wherein the scan data includes any combination of the reference data and the scan image data.

2. The image forming apparatus of claim 1, wherein the ESD detector comprises a flip-flop configured to output an ESD detection signal to the data processor when the ESD is detected, and maintain a high state of the EDS detection signal until a synchronization point of a next scan line.

3. The image forming apparatus of claim 1, wherein the ESD detector comprises a voltage divider circuit configured to convert an ESD signal into a voltage having a level detectable by a flip-flop.

4. The image forming apparatus of claim 1, wherein when the operation state of the scanner is determined as the calibration operation, the data processor transmits a signal to the scanner, which indicates a need to re-scan a current scan line of the scan target.

5. The image forming apparatus of claim 1, wherein when the operation state of the scanner is determined as the real scan operation, the data processor generates the replacement scan data by interpolating data based on scan data of scan lines adjacent to a current scan line and replacing the scan data of the current scan line with the generated replacement scan data.

6. The image forming apparatus of claim 5, wherein the scan lines adjacent to the current scan line are scan lines, which precede the current scan line and succeed the current scan line and in which no ESD has occurred.

7. The image forming apparatus of claim 5, wherein the data processor interpolates the data by applying a filter coefficient to the scan data of the scan lines adjacent to the current scan line, wherein the filter coefficient is determined according to a distance between the current scan line and the scan lines adjacent to the current scan line.

8. The image forming apparatus of claim 1, wherein the data processor transmits a signal indicating the ESD is detected and a signal indicating a correction of the scan data, to a user interface.

9. A method of processing scan data, the method comprising:
acquiring scan data by scanning a scan target using a scanner;
detecting an electrostatic discharge (ESD);
determining, with a data processor, an operation state of the scanner, when the ESD is detected, as a calibration operation to acquire reference data or a real scan operation to acquire scan image data;
deleting at least a portion of the scan data which is acquired during the calibration operation upon the determined operation state of the scanner when the ESD is detected being the calibration operation and reacquiring the portion of the scan data by rescanning the scan target and replacing the portion of the scan data deleted, the scan data acquired acquired during the calibration operation including the reference data; and
generating replacement scan data without requiring the rescanning of the scan target upon the determined operation state of the scanner when the ESD is detected being the real scan operation, and replace the scan data acquired during the real scan operation with the generated replacement scan data,
wherein the scan data includes any combination of the reference data and the scan image data.

10. The method of claim 9, wherein the detecting of the ESD comprises outputting an ESD detection signal to the data processor when the ESD is detected, and maintaining a high state of the ESD detection signal until a synchronization point of a next scan line.

11. The method of claim 9, wherein the detecting of the ESD comprises converting an ESD signal into a voltage having a level detectable by a flip-flop.

12. The method of claim 9, wherein, when the operation state is determined as the calibration operation, the reacquiring comprises transmitting a signal to the scanner, which indicates a need to re-scan a current scan line of the scan target.

13. The method of claim 9, wherein, when the operation state is determined as the real scan operation, the generating replacement scan data comprises interpolating data based on scan data of scan lines adjacent to a current scan line and replacing the scan data of the current scan line with the generated replacement scan data.

14. The method of claim 13, wherein the scan lines adjacent to the current scan line are scan lines, which precede the current scan line and succeed the current scan line and in which no ESD has occurred.

15. The method of claim 13, wherein the processing of the scan data further comprises performing interpolation by applying a filter coefficient to the scan data of the scan lines adjacent to the current scan line, wherein the filter coefficient is determined according to a distance between the current scan line and the scan lines adjacent to the current scan line.

16. The method of claim 9, further comprising displaying ESD occurrence/non-occurrence information and scan data correction/non-correction information.

17. At least one non-transitory computer readable medium storing computer readable instructions which when executed control at least one processor to implement the method of claim 9.

* * * * *

UNITED STATES PATENT AND TRADEMARK OFFICE
CERTIFICATE OF CORRECTION

PATENT NO. : 9,894,218 B2
APPLICATION NO. : 14/534878
DATED : February 13, 2018
INVENTOR(S) : Jung-han Kim et al.

Page 1 of 1

It is certified that error appears in the above-identified patent and that said Letters Patent is hereby corrected as shown below:

In the Claims

Column 10, Claim 9, Line 4, after "acquired" delete "acquired".

Signed and Sealed this
Twenty-first Day of August, 2018

Andrei Iancu
*Director of the United States Patent and Trademark Office*